United States Patent
Madhvanath et al.

(10) Patent No.: US 8,358,200 B2
(45) Date of Patent: Jan. 22, 2013

(54) METHOD AND SYSTEM FOR CONTROLLING COMPUTER APPLICATIONS

(75) Inventors: Sriganesh Madhvanath, Karnataka (IN); Rahul Ajmera, Karnataka (IN)

(73) Assignee: Hewlett-Packard Development Company, Houston, TX (US)

( * ) Notice: Subject to any disclaimer, the term of this patent is extended or adjusted under 35 U.S.C. 154(b) by 1000 days.

(21) Appl. No.: 12/234,722

(22) Filed: Sep. 22, 2008

(65) Prior Publication Data
US 2009/0102604 A1    Apr. 23, 2009

(30) Foreign Application Priority Data
Oct. 23, 2007  (IN) .......................... 2391/CHE/2007

(51) Int. Cl.
*G06F 7/04* (2006.01)
(52) U.S. Cl. ..................... 340/5.83; 340/5.52; 340/5.53; 340/5.81; 340/5.82; 382/124
(58) Field of Classification Search ............... 340/5.82, 340/5.83, 1.1, 5.1, 5.52, 5.53, 5, 5.8, 5.81; 715/716; 382/115–127; 348/77; 396/14–18; 358/474; 902/3
See application file for complete search history.

(56) References Cited

U.S. PATENT DOCUMENTS

| | | | |
|---|---|---|---|
| 6,850,252 B1 * | 2/2005 | Hoffberg | 715/716 |
| 6,941,001 B1 * | 9/2005 | Bolle et al. | 382/124 |
| 2002/0181747 A1 * | 12/2002 | Topping | 382/124 |
| 2003/0038824 A1 * | 2/2003 | Ryder | 345/684 |
| 2004/0151353 A1 * | 8/2004 | Topping | 382/124 |
| 2005/0085217 A1 * | 4/2005 | Lim | 455/410 |
| 2006/0284853 A1 * | 12/2006 | Shapiro | 345/173 |

OTHER PUBLICATIONS

AuthenTec; http://www.authentec.com/; 1 Page; download date: Feb. 15, 2011.
Kori Inkpen, Kellogg S. Booth, Steven D. Gribble, Maria Klawe; Give and Take: Children Collaborating on One Computer; pp. 1 to 4, Download date: Feb. 15, 2011.
Microsoft Research; http://research.microsoft.com/displayartiid=1471; pp. 1 to 6; download date: Feb. 15, 2011.

* cited by examiner

*Primary Examiner* — George Bugg
*Assistant Examiner* — Sisay Yacob (57) ABSTRACT

A method and system for controlling computer applications on a computer system(s). The method comprising: detecting at least one finger of a user's hand on an input device; capturing and transmitting the user's fingerprint data to a computer system; identifying the user from the captured fingerprint data; and controlling at least one computer function associated with the fingerprint data of the identified user.

13 Claims, 5 Drawing Sheets

METHOD AND SYSTEM FOR CONTROLLING COMPUTER APPLICATIONS

RELATED APPLICATIONS

Benefit is claimed under 35 U.S.C. 119(a)-(d) to Foreign application Ser No. 2391/CHE/2007 entitled "METHOD AND SYSTEM FOR CONTROLLING COMPUTER APPLICATIONS" by Hewlett-Packard Development Company, L.P., filed on 23 Oct. 2007, which is herein incorporated in its entirety by reference for all purposes.

BACKGROUND OF THE INVENTION

The computer mouse has become one of the most preferred input devices for personal computer (PC) users. Since the early 1960's when the first computer mouse was invented, the mouse has redefined the way people interact with computers. It has become the computer-human interface of choice for most people.

A common function of a mouse is to control the movement of a cursor on a display screen. Motion of the mouse produces a corresponding motion of the cursor. A user input is typically provided by pressing one of the mouse buttons (assuming, there are more than one), which generates an event stream for the computer to perform a specified function. Since most personal computers have a single mouse, a user input produces only a single stream of events. This has many disadvantages. First, the target of the mouse event stream (such as a software application, or display, in case more than one displays exist) needs to be selected explicitly. This can be a problem when the user needs to frequently switch between applications or displays. Second, the interpretation of the mouse event stream (e.g. drawing, gesture, cursor control) needs to be selected explicitly (e.g. by pressing a button to select a mode). This interferes with fluid interaction encompassing multiple modes. Third, when multiple users are using the same computer, the active user needs to be selected explicitly. One of the methods which has been tried to overcome the above difficulties is to use multiple mice for a single computer. However, it has been realized that even this approach has limitations as it requires considerable real estate and is not suitable for portable computers. The present invention describes how a single pointing device with the ability to distinguish different fingers can be used to provide multiple mouse event streams, which in turn can control different applications and displays.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENT

There will be described a system and method for controlling computer applications. More particularly, there will be described a system and method for controlling computer applications based on fingerprint identification by providing multiple mouse event streams from a single input device. The computer application(s) may be located on a standalone personal computer or multiple computer systems on a computer network.

It may be noted that for the purpose of this description, the term computer function includes any operation performed by a computer system, such as, but not limited to, opening/closing of a computer program, a mouse input (such as a mouse click and movement of a cursor), a gesture input, selection of a tool on the user interface of a computer application etc.

Figure 1:
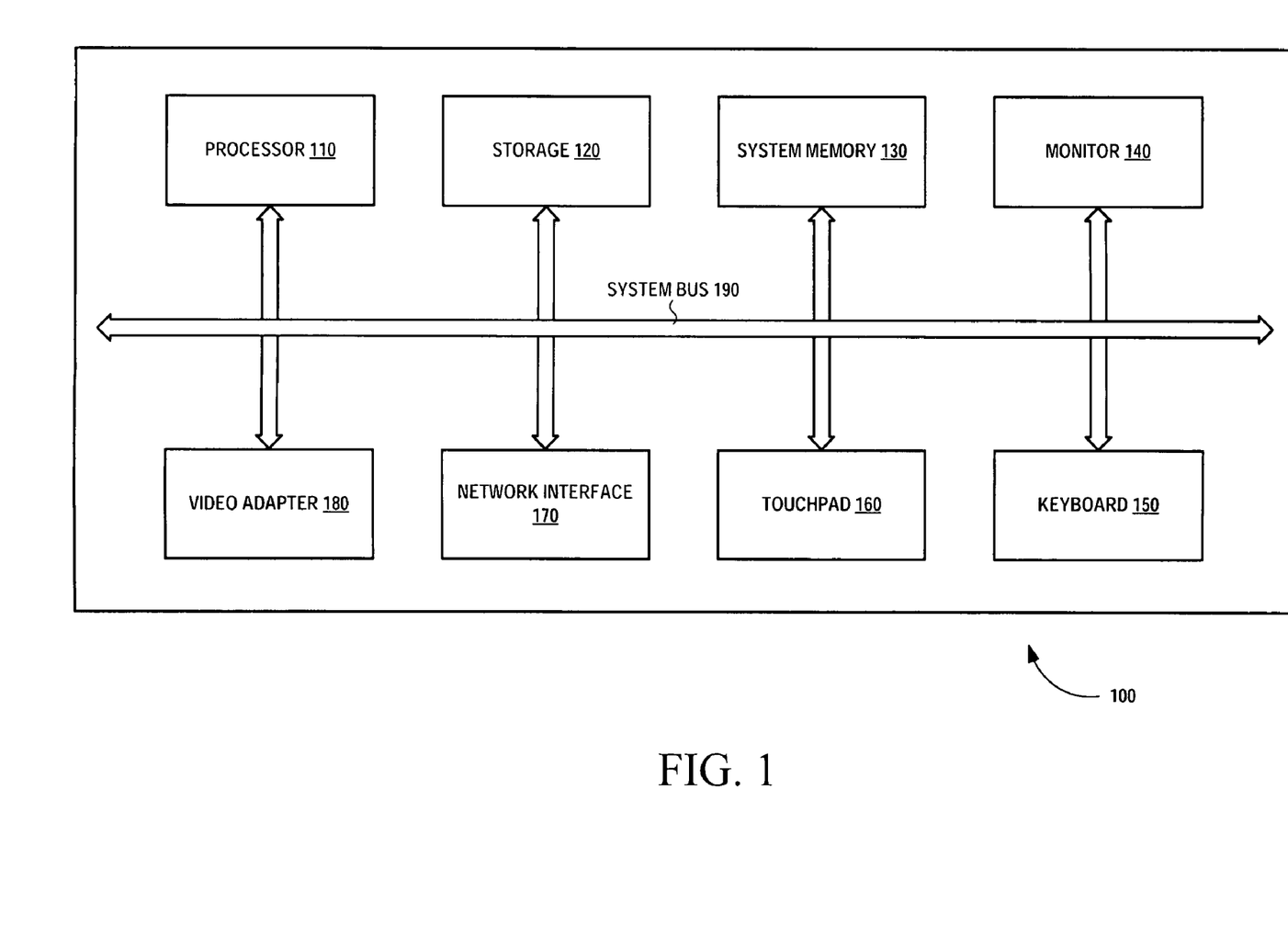
FIG. 1 illustrates an exemplary block diagram depicting hardware components of a computer system which embodies the method of the present invention.

Referring to FIG. 1, there is shown an exemplary block diagram depicting hardware components of a computing device which embodies the method of the present invention.

In FIG. 1, a computing device 100 includes a processor 110, storage medium 120, a system memory 130, a monitor 140, a keyboard 150, a touchpad 160, a video adapter 180 and a network interface 170. These components are coupled together through a system bus 190.

The storage medium 120 (such as a hard disk) stores a number of programs including an operating system, application programs and other program modules. A user may enter commands and information into the computing device 100 through input devices, such as a keyboard 150, a touch pad 160 and a mouse (not shown). The monitor 140 is used to display textual and graphical information.

An operating system runs on processor 110 and is used to coordinate and provide control of various components within personal computing device 100 in FIG. 1.

It would be appreciated that the hardware components depicted in FIG. 1 are for the purpose of illustration only and the actual components may vary depending on the computing device deployed for implementation of the present invention. Further, the computing device 100 may be, for example, a desktop computer, a laptop computer, or a wireless device such as a mobile phone, a personal digital assistant (PDA), a hand-held computer, etc. Furthermore, the computing device 100 may be a standalone personal computer or a network computer(s).

Figure 2:
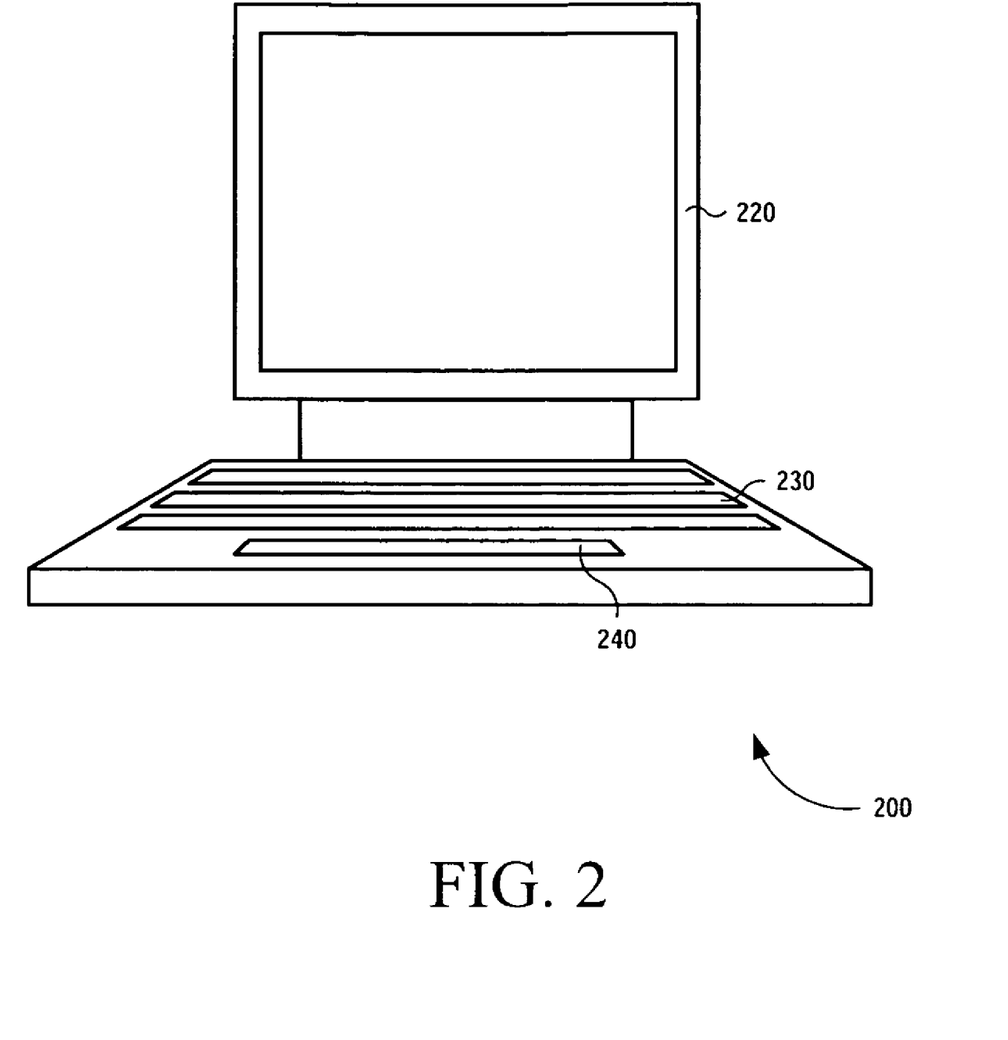
FIG. 2 illustrates a diagram of a computing system that may be used in accordance with an embodiment of the present invention.

FIG. 2 illustrates an exemplary computing system 200 that may be used in accordance with an embodiment of the present invention.

Computing system 200 includes a computing device 210, such as computing device of FIG. 1, a display 220, a keyboard 230, a touchpad 240 and a biometric sensor (not shown).

Display 220 may be a cathode ray tube or some form of flat panel display such as a liquid crystal display (LCD). In the present embodiment, it is used to present a user input received, for example, through touchpad 240.

Keyboard 230 may be a standard QWERTY-based or any other keyboard which can be used to input data to the computing device 210.

Touchpad 240 is a touch-sensitive pad, which is generally used as a pointing device on portable computers, personal digital assistant (PDA), mobile devices etc. Touchpad is base on a principle called coupling capacitance, and requires a conductive pointer such as a finger. It contains a two-layer grid of electrodes which are connected to an integrated circuit (IC) mounted under the pad. The upper layer contains vertical electrode strips while the lower layer is composed of horizontal electrode strips. Capacitance from each of the horizontal electrodes to each of the vertical electrodes is measured by the IC. A finger near the intersection of two electrodes modifies the capacitance between them, since a finger has very different dielectric properties than air. By moving a finger or other object along the pad, a user can move the pointer on the display screen. When a user touches the surface, the fingertip distorts the electrical field at that spot. The position of the finger is determined based on these changes at various locations.

At the time of use, a user places his/her finger on the touchpad, which is coupled to a computing device. The touchpad obtains an image of a user's finger in contact with the touchpad and produces a data signal in response to the image. The data signal is conveyed to computer and is used to control a function on a selected computer application.

Figure 3:
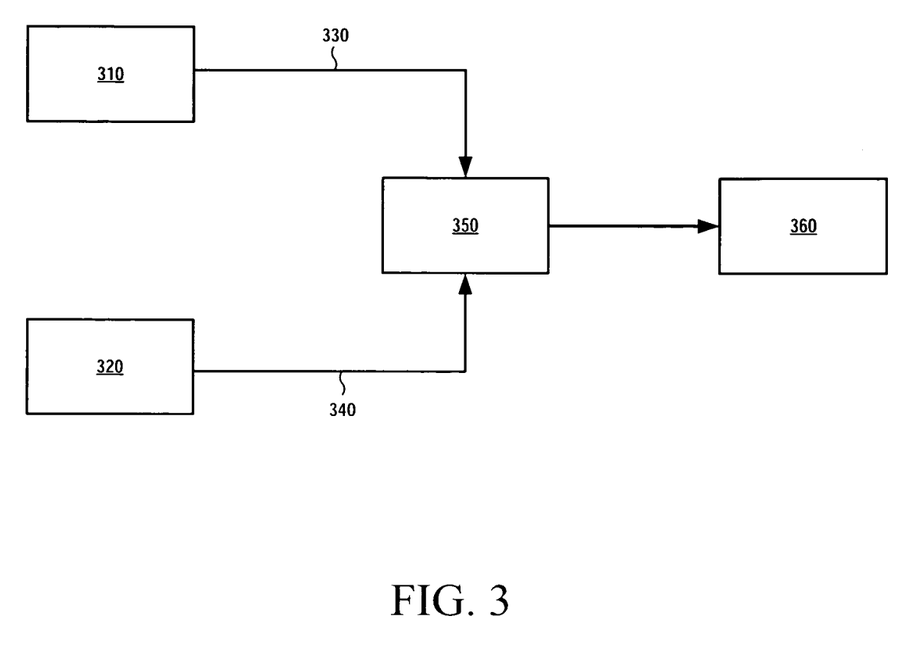
FIG. 3 is an exemplary diagram illustrating user input to a computing system.

FIG. 3 is an exemplary block diagram illustrating user input to a computing system.

Touch pad 310 and biometric sensor 320 are used to provide user input to the computing system 350. In the present embodiment, touchpad 310 and biometric sensor 320 form a single unit. However, in an alternate embodiment, their functions may be performed by two separate components.

As stated above, touchpad 310 is a touch-sensitive pad, which is generally used as a pointing device on portable computers. It is capable of simulating mouse inputs such as cursor movements and mouse button clicks.

Biometric sensors, such as biometric sensor 320, are basically sensors that are able to identify an individual user based upon some characteristic of the user. Known types of biometric sensors include fingerprint sensors, voice recognition sensor, iris sensors etc. A biometric sensor operates by acquiring biometric data from an individual. Many biometric scanning technologies can be used that will be familiar to those skilled in the art of biometric measurement and are not described here. The present embodiment uses a fingerprint biometric sensor. Some of the commonly used fingerprint sensor technologies, such as, but not limited to, ultrasonic sensor imaging, optical sensor imaging and capacitance sensor imaging, may be used to capture the fingerprint data of an individual. The captured data is converted into a digital image which is processed to create a fingerprint pattern. The characteristics of the fingerprint pattern are established by means of special algorithms.

In the present embodiment, each fingerprint contact made by a user on the touchpad 310 is treated as a mouse input and converted into a data signal 330. The data signal along with the fingerprint data 340 captured by the biometric sensor 320 is transmitted to the computing system 350 as a mouse event stream. The computing system 350 processes the mouse event stream as an input and provides a corresponding output on the display 360.

Figure 4:
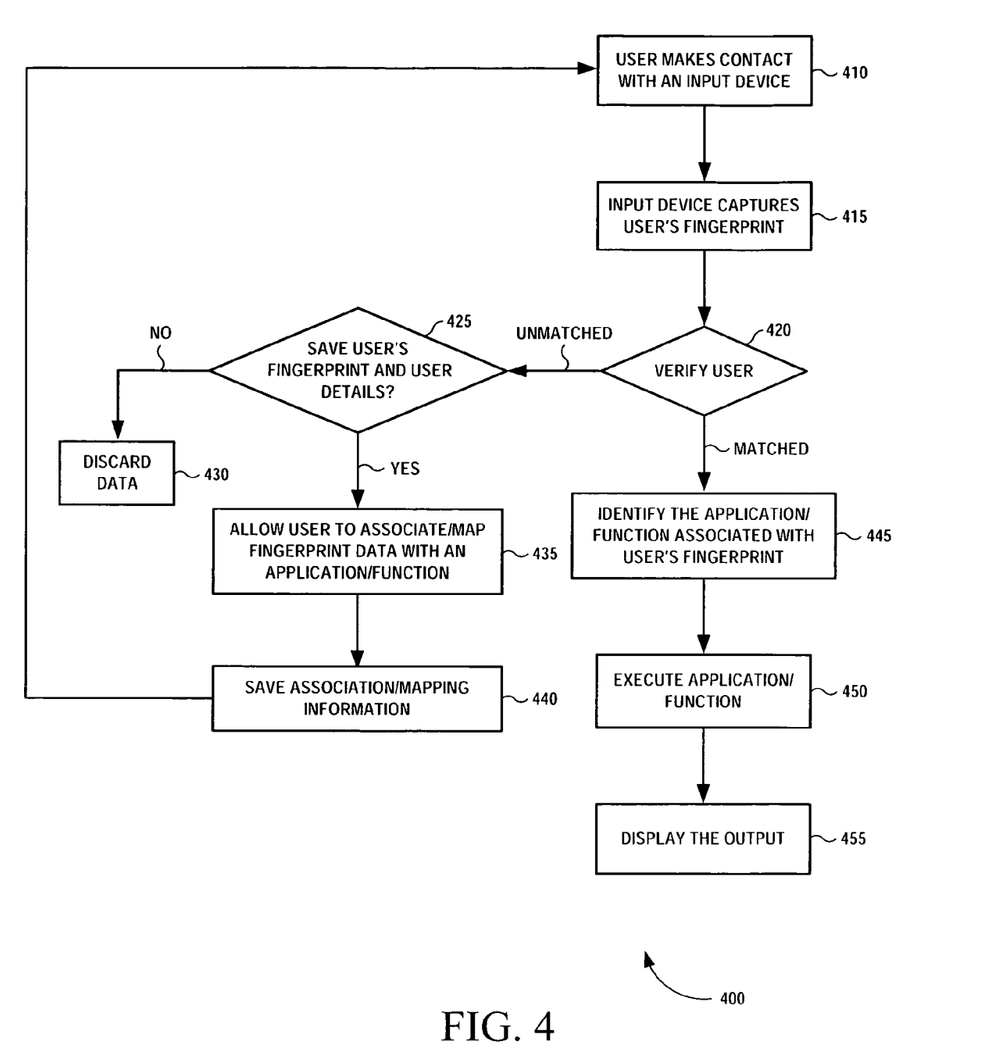
FIG. 4 provides a flowchart showing method steps for controlling a computer application based on fingerprint identification.

FIG. 4 provides a flowchart showing method steps for controlling computer applications based on fingerprint identification.

In the present embodiment, the method described uses a touchpad (along with a biometric sensor) as an input device for providing multiple inputs (mouse event streams) to a computing device. However, it would be appreciated that other input devices, such as, but not limited to, a pointing stick, a mouse or a prism (through which the movement of a finger can be tracked using a camera), may also be used, in conjunction with a biometric sensor.

At step 410, a user uses his/her finger to make contact (touch) with a touchpad.

At step 415, the touchpad along with biometric sensor determines the location of the user's finger and captures the user's fingerprint. The captured fingerprint data along with location information is sent to the computing device as a mouse event stream.

At step 420, the computing device compares the received fingerprint data in the mouse event stream to a reference database of known fingerprints to determine the identity of the user. The reference database may be present on the same computing device or a network computer.

If the received fingerprint data does not match with the reference database of known fingerprints, an option to save the unrecognized fingerprint data along with user details is provided to the user (step 425).

If the received fingerprint data matches with the reference database of known fingerprints, the process moves to step 445.

At step 425, the user has an option to save or ignore the captured fingerprint data. If the user chooses to save the data, the user is asked to provide user details (such as, but not limited to, user name, social security no., email address etc.) to the computing device. Once the user inputs the required information, the process moves to step 435. If the user decides to ignore the save option, the captured data is discarded by the computing device and the user input (mouse event stream) is ignored (step 430).

At step 435, the user is prompted to associate or map his/her specific fingerprint data to at least one specific function, interpretation and/or display (including virtual desktops supported by many operating systems). For example, the user may assign his/her left forefinger to one interpretation and right forefinger to another interpretation. The user can assign different functions to the same fingerprint data depending on the context of the computer application. For example, the user may assign "edit" option to his/her left index finger for Microsoft Word program and "save" option for Microsoft Excel.

To provide some more specific examples, by way of illustration only, in one scenario, the user may assign one fingerprint data to a gesture and another fingerprint data to a mouse input.

In another scenario, different interpretations may be assigned to the same gesture shape made using different fingers (for example, the gesture 'p' made with the user's forefinger may launch Microsoft PowerPoint, but with middle finger, it may launch Microsoft Project).

In a further scenario, an up-and-down swiping motion made with the user's forefinger may cause scrolling, but with the middle finger, it may control volume.

In a still further scenario, assuming there is a computer system with two displays, a user may assign one finger to control a cursor in one display and a second finger to control the cursor in another display.

In an additional further scenario, a user may map all his/her fingers of one hand with a specific computer application to perform a variety of functions. For example, a user may choose to map his/her index finger to open a database application, middle finger to close the database application, ring finger to save data in the database application and little finger to edit content in the database application. In another example, the fingers of the left hand may be mapped to different drum sounds (tapping or rubbing the finger can cause the specific drum to be played) and the fingers of the right hand may be mapped to different sound equalizer controls for bass, midrange and treble. In a yet another example, different fingers may be mapped to different fonts or font styles, such as normal, bold, italics etc. so that the same character may appear in normal or bold style depending on the finger used to write the character.

The identity of the fingers may also be used to determine the exact position of the hand on the touchpad, or different gestures, which cannot be known by just knowing the positions of the fingers alone. For example, the degree of rotation of a virtual knob held using all five fingers can be known from the identities of the five fingers.

It would be appreciated that the above given examples are by no means exhaustive and further scenarios would be readily apparent to those skilled in the art.

At step 440, once the user completes associating or mapping his/her fingerprints to specific functions, the fingerprint data along with user details and mapped functions are saved in a computer database, and the process returns to step 410.

The fingerprint data along with user details and mapped applications may be stored in a computer database which may be located on the same computing device or at a remote location on a network computer. Further, the network may be wired or wireless.

At step 445, the computing device identifies the application associated with the identified user's fingerprint in the database.

At step 450, the computing device executes the application associated with the identified user's fingerprint.

At step 455, the output is presented on a display.

The method can be implemented in a computer system in the form of a computer program, which could be a part of the operating system software or otherwise.

The above described method offers many advantages. The user can switch between displays (in a multi-display device) or different applications simply by using a different finger on the touchpad, without the need for explicitly switching modes, or explicitly using a biometric sensor to identify the finger. Input from different fingers can be assigned different interpretations—e.g. drawing input, mouse movement, gestures for launching commands etc. Ordinarily these modes would require explicit selection.

Further extensions and variations of the above described method and system are possible which would be readily apparent to those skilled in the art. To provide one illustration, it is possible to assign different meanings to different combinations of fingers using the above method. For example, index finger in combination with middle finger may be assigned one function and middle finger in combination with ring finger may be assigned another function. A second illustration of a possible extension could be a scenario where different users can use a shared computer collaboratively. An example of a collaborative environment could be a multi-player game (such as, tic-tac-toe) where players can take turns to play the game. Another example could be a collaborative drawing application where participants can draw simultaneously. In another possible extension, a user may be given an option to decide the mode of his/her input to a computing device based on his/her convenience. For example, a user may map a function to a touch-based input, a tap-based input, or a combination of these input means. In another example, a function may be mapped to a collective input from a physical mouse (say, a single mouse click) and a fingerprint sensor (say, touch or tap).

Figure 5A:
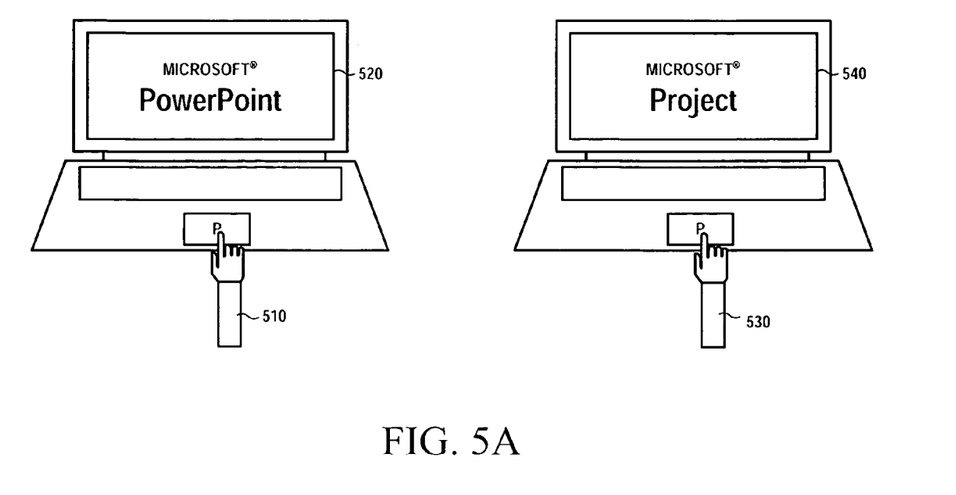
FIGS. 5A and 5B are examples of the described method.
Figure 5B:
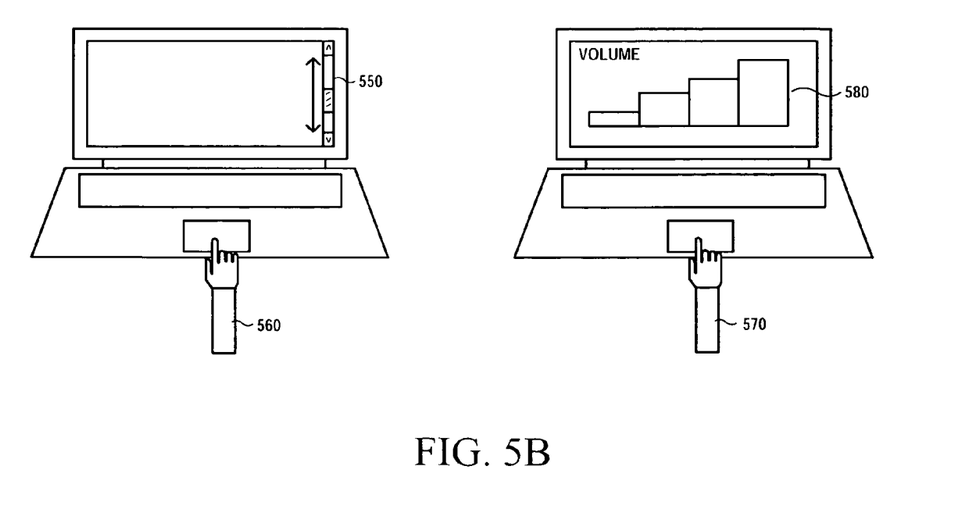

FIGS. 5A and 5B illustrate examples of providing multiple inputs (mouse event streams) from a single pointing device using fingerprint identification.

It is assumed, for the purpose of these exemplary embodiments, that a user's fingerprint data already exist in the database of the computing device having a touchpad and the user has mapped his/her fingers (fingerprint data) to various functions or interpretations.

FIG. 5A illustrates mapping of different interpretations to the same gesture shape made using different fingers. The method described allows a user to input a common gesture 'p' to launch two different applications. The user uses his/her left index finger 510 to launch Microsoft PowerPoint 520 and right index finger 530 to launch Microsoft Project 540, while the gesture ("p") remains the same. FIG. 5B illustrates an example where the method described allows a user to assign an up-and-down swiping motion to both his/her index and middle fingers. Using the same swiping motion, the user can control scrolling 550 with the index finger 560 and volume control 580 with the middle finger 570.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A method for controlling a computer application on a computer, the method comprising:
   detecting at least one finger of a user's hand on an input device;
   capturing and transmitting the user's fingerprint data to a computer;
   comparing the captured fingerprint data with stored fingerprint data;
   upon determining that the captured fingerprint data does not match the stored fingerprint data, providing a user interface allowing the user to associate the captured fingerprint data with a function, and saving the association with the stored fingerprint data;
   upon determining that the captured fingerprint data matches the stored fingerprint data:
      identifying the user from the captured fingerprint data;
      identifying at least one function associated with the captured fingerprint data of the identified user; and
      executing the at least one function depending upon a context of the computer application.

2. The method of claim 1, wherein the at least one function associated with the fingerprint data of the user includes a mouse input and a gesture input.

3. The method of claim 1, wherein capturing the user's fingerprint data includes identifying a location of the user's finger on the input device.

4. The method of claim 1, wherein transmitting the captured user's fingerprint data to a computer includes sending the captured fingerprint data as a mouse event stream.

5. The method of claim 1, wherein the user is identified from the captured fingerprint data by reference to a database.

6. The method of claim 1, wherein the input device is a touchpad.

7. A system for controlling a computer application on a computer, the system comprising:
- an input device actuable by at least one finger of a user's hand, the input device to capture and transmit the user's fingerprint data to a computer; and
- a computer to:
  - compare the user's captured fingerprint data with the stored fingerprint data;
  - determine whether the user's captured fingerprint data matches the stored fingerprint data;
  - upon a determination that the captured fingerprint data does not match the stored fingerprint data, the computer to receive an indication of a function to associate with the user's captured fingerprint data, and to save the association with the stored fingerprint data;
  - upon a determination that the captured fingerprint data matches the stored fingerprint data, the computer to:
    - identify the user from the captured fingerprint data;
    - identify at least one function associated with the captured fingerprint data based on the stored fingerprint data; and
    - execute the at least one function depending upon a context of the computer application.

8. A system of claim 7, wherein the input device includes means for sending the fingerprint data as a mouse event stream.

9. A non-transitory computer medium, the non-transitory computer medium comprising machine readable instructions that when executed by a computer, causes the computer to:
- compare captured user's fingerprint data with stored fingerprint data;
- based on the comparison, determine whether the user's captured fingerprint data matches the stored fingerprint data;
- upon a determination that the captured fingerprint data does not match the stored fingerprint data, the computer to receive an indication of a function to associate with the user's captured fingerprint data, and to save the association with the stored fingerprint data; and
- upon a determination that the captured fingerprint data matches the stored fingerprint data, the computer to:
  - identify the user from the captured fingerprint data;
  - identify the at least one computer application and at least one function associated with the captured fingerprint data based on the stored fingerprint data; and
  - execute the at least one function depending upon a context of a computer application.

10. The method of claim 1, wherein comparing the captured fingerprint data with stored fingerprint data comprises determining if the captured fingerprint data matches the stored fingerprint data for specific fingers on the user's hand.

11. The method of claim 1, wherein comparing the captured fingerprint data with stored fingerprint data comprises determining a degree of rotation of the user's hand from the captured finger print data, and determining if the determined rotation matches a degree of rotation in the stored fingerprint data.

12. A system of claim 7, wherein the computer to compare the captured fingerprint data comprises determining if the captured fingerprint data matches the stored fingerprint data for specific fingers on the user's hand.

13. The system of claim 12, wherein the computer to compare the captured fingerprint data comprises determining a degree of rotation of the user's hand from the captured finger print data, and determining if the determined rotation matches a degree of rotation in the stored fingerprint data.

* * * * *

UNITED STATES PATENT AND TRADEMARK OFFICE
CERTIFICATE OF CORRECTION

PATENT NO. : 8,358,200 B2
APPLICATION NO. : 12/234722
DATED : January 22, 2013
INVENTOR(S) : Sriganesh Madhvanath et al.

Page 1 of 1

It is certified that error appears in the above-identified patent and that said Letters Patent is hereby corrected as shown below:

In the Claims

In column 8, line 24, in Claim 11, delete "finger print" and insert -- fingerprint --, therefor.

In column 8, lines 33-34, in Claim 13, delete "finger print" and insert -- fingerprint --, therefor.

Signed and Sealed this
Twenty-third Day of April, 2013

Teresa Stanek Rea
*Acting Director of the United States Patent and Trademark Office*